United States Patent Office 3,112,485
Patented Nov. 26, 1963

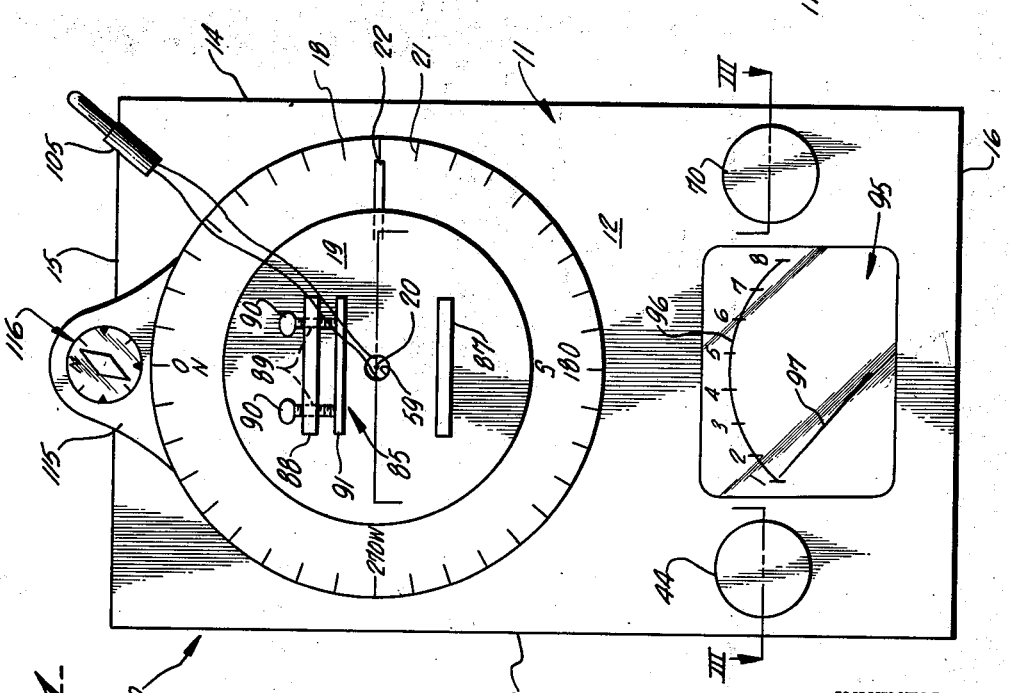

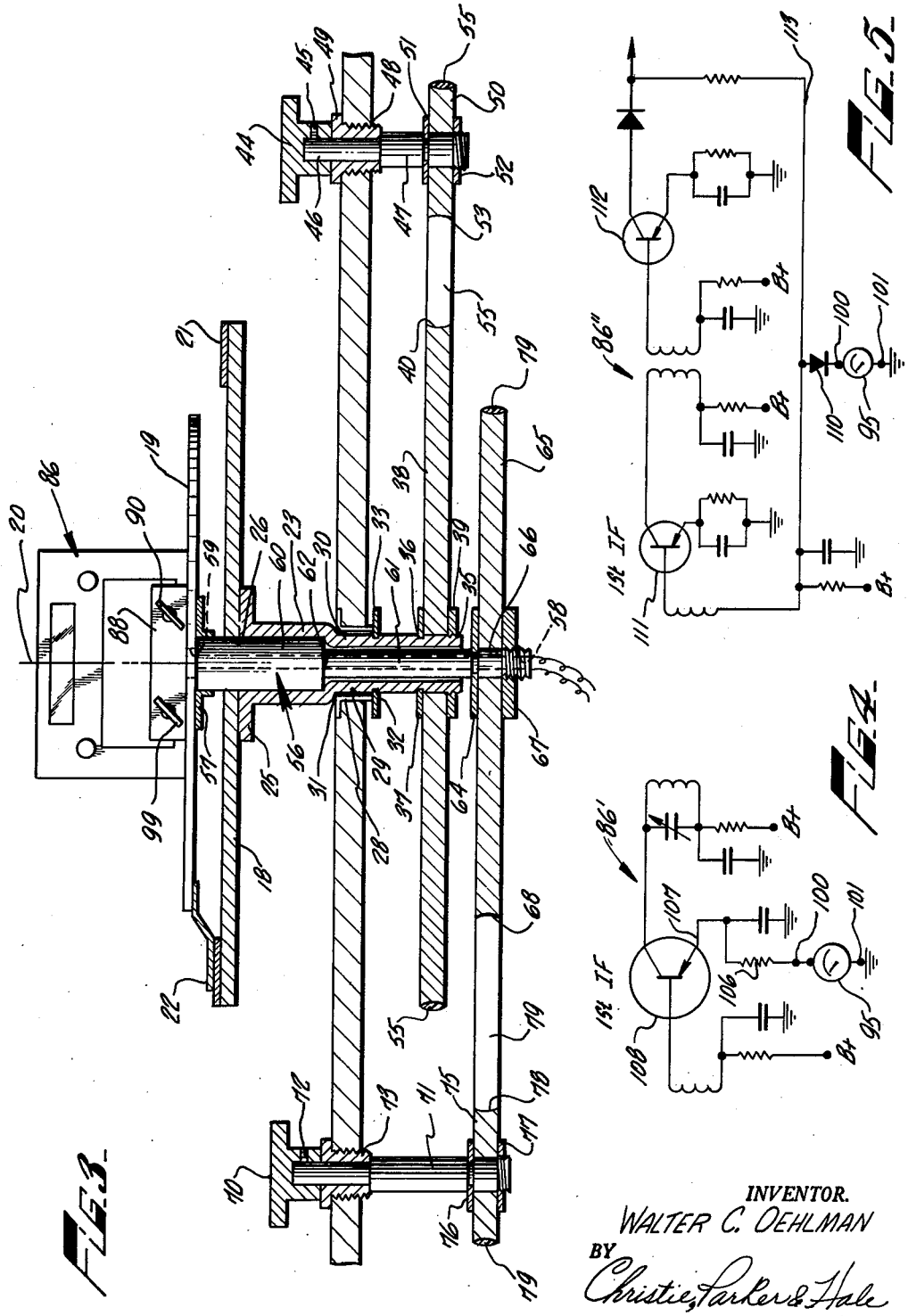

3,112,485
RADIO DIRECTION FINDER
Walter C. Oehlman, 3468 N. Big Dalton Ave.,
Baldwin Park, Calif.
Filed Sept. 18, 1961, Ser. No. 138,977
4 Claims. (Cl. 343—115)

This invention relates to direction finders and navigational aids; more particularly, it relates to apparatus for use with a portable radio as a direction finder.

Radio direction finders are presently known and find wide use in nautical and aeronautical environments. These devices, however, are designed specifically for their direction-finding functions and are generally expensive and heavy devices. Furthermore, these devices are not normally self-powered but require the availability of suitable electrical power. For these reasons, the utilization of known devices is limited even though there is a need for such direction finders and navigational aids in small boats and in light aircraft. The most common form of direction finder known prior to this invention required maneuvering of the craft in order that the functions of the direction finder be properly produced in a usable form.

This invention, on the other hand, provides an inexpensive apparatus which uses an existing battery-powered portable radio. The device is powered by the radio and is not dependent for its use upon the availability of other sources of electrical power. For this reason, this invention finds particular use on small boats, particularly sailboats, and in light aircraft. A particular advantage of the direction finder of this invention is that it does not require maneuvering of the craft. This is advantageous since, when used in power boats or sailboats, the maneuvering as required by devices of the prior art is not always feasible, particularly if the craft is disabled. This invention provides a direction finder which is as accurate as devices using more conventional techniques and features, and yet, even though a portable radio is utilized, this invention is not destructive of the normal performance of the radio.

Generally speaking, this invention provides an apparatus for utilizing a portable radio as a direction finder. The invention comprises a base having a direction indicating means, such as a compass rose, movably mounted to the base. Means for holding a portable radio are mounted for movement relative to the direction indicating means. Also, means responsive to an electrical condition of the radio circuit, such as a milliammeter, are mounted to the base. The invention further includes means for operatively connecting the circuit condition responsive means to the radio when the radio is engaged in the holding means.

The following detailed description and explanation of this invention will be facilitated by reference to the accompanying drawings, wherein:

FIGURE 1 is a plan view of the direction finder;

FIGURE 2 is a plan view of the underside of the direction finder;

FIGURE 3 is an enlarged cross-sectional view of the apparatus as taken along the offset section line III—III of FIGURE 1;

FIGURE 4 is a schematic diagram of one manner of connection of the meter to a transistor radio circuit; and FIGURE 5 is a schematic diagram illustrating a second manner of connection of the meter to a transistor radio circuit.

Referring to FIGURE 1, a direction finder and navigational aid 10 is illustrated. The direction finder comprises a base 11 in the form of a cabinet, shell, or housing of generally rectangular configuration and having an upper surface 12. The cabinet 11 has elongated sides 13 and 14 and ends 15 and 16. A table or platform 18 is mounted to the cabinet 11 adjacent end 15. A second table or platform 19 is mounted above the lower or first platform 18 adjacent the same end 15.

As illustrated more clearly in FIGURE 3, the platforms 18 and 19 are generally circular and are mounted for rotation about a common axis 20. Table 18 has a compass rose 21 or similar direction indicating index or register disposed about its upper periphery. A pointer 22 is mounted to the underside of the radio platform 19 and cooperates with the positioning indicating device or compass rose 21 on the platform 18. The compass rose platform 18 is mounted to a hollow sleeve or shaft 23 which extends through an opening 24 in the top 12 of cabinet 11. The shaft 23 has an outwardly flanged portion 25 at its upper end to which the platform 21 is secured by screws, bonding, or any suitable means. The platform 21 has a central aperture 26 to allow a second or radio mounting platform 56 to pass therethrough.

The aperture or hole 24 in the cabinet 12 is lined with a bushing 28 which serves as a bearing for the sleeve 23. The sleeve 23, immediately adjacent the upper flanged end 25, has a diameter greater than that of an opening 29 provided through the bushing 28. The sleeve 23 is stepped downwardly to a reduced diameter portion 30 to pass through the bushing 28. A downwardly opening external shoulder 31 is formed between the upper 25 and lower 30 portions of sleeve 23 and bears against bushing 28. A first external peripheral groove 32 is formed in the sleeve 23 below the cabinet top 12 and is adapted to receive a snap-fit retaining ring 33 to anchor the sleeve 23 axially relative to the bushing 28.

The sleeve or hollow shaft 23 extends downwardly below the cabinet top 12 to terminate in a threaded end 35. A second circumferential groove 36 is formed in the exterior of the sleeve 23 at a location spaced below that of the first groove 32 which holds the retaining ring 33. A retainer or spring-clip 37 is engaged in the second groove 36 and serves as a position limiter for a pulley 38 engaged over the end of the sleeve 23. The pulley 38 is securely anchored relative to the shaft 23 and to the positioning retainer 37 by a nut 39. The pulley 38 has a concave peripheral surface 40.

Referring once again to FIGURE 1, a knob 44 is mounted above the upper surface 12 of the cabinet 11. Knob 44 is secured by a setscrew 45 to the upper reduced diameter end portion 46 of a shaft 47. The reduced diameter portion 46 is engaged in a bushing 48 threaded into the cabinet top 12. The upper end of the bushing 48 has a peripheral flange 49 which serves as the thrust bearing for the knob 44. At the lower end of the shaft 47 below the upper side 12 of the cabinet 11 a pulley 50, illustrated as having a diameter considerably smaller than the diameter of the pulley 38, is secured to the shaft by a spring retainer or clip 51 and a nut 52. The pulley 50 has a concave peripheral surface 53. The pulleys 38 and 50 are coupled together operatively by a loop or belt 55. Rotation of the knob 44 over a finite arc causes the lower or compass rose platform 18 to rotate over a much smaller arc by virtue of the differing diameters between pulleys 38 and 50. In this way, a fine degree of control in positioning of the compass rose platform 18 is possible.

As illustrated in FIGURE 3, the upper or radio holding platform 19 is rotatably mounted about the axis 20. The platform 19 is secured to a shaft 56 by an outwardly flanged fitting 57 affixed to the upper end of the shaft 56. The shaft 56 has an axial bore 58 extending through its extent. A central aperture 59 is formed coaxially with the table or platform 19 such that, when the platform 19 is secured to the flanged fitting 57, the aperture 59 is aligned with the shaft bore 58. The shaft 56 has an enlarged first diameter portion 60 which lies within the upper portion of the hollow sleeve 23. The first diameter portion 60 of the shaft 56 extends to adjacent the upper surface 12 of the cabinet 11 where it is stepped down into a second or reduced diameter portion 61. A downwardly opening shoulder 62 is thus formed. An external shoulder 62 of shaft 56 bears against the internal upwardly opening shoulder between the different diameter portions of the sleeve 23.

Adjacent the lower end 35 of the sleeve 23, the shaft 56 is grooved to accommodate a spring retaining washer 64. A pulley 65 having a central axial bore or aperture 66 is fitted over the lower depending end of the shaft 56 and is secured against the washer 64 by a nut 67 threaded to the lower end of the shaft 56. The pulley 65 has a concave peripheral surface 68.

A second or radio platform control knob 70 is mounted to the cabinet 11 opposite from the compass rose platform control knob 44. Knob 70 is mounted to a shaft 71 by a setscrew 72. A bushing 73 journals shaft 71 to the cabinet top 12. Shaft 71 is similar to shaft 47, except that the enlarged diameter portion thereof is longer than that of shaft 47. A pulley 75 is secured to the lower end of shaft 71 by a retainer clip 76 and by a nut 77 threaded to the shaft 71. The pulley 75 has a concave peripheral surface 78. The pulley 75 is located coplanar with the pulley 65 and is coupled operatively thereto by a belt 79. As is the case with the pulley pair 38 and 50, the pulley 75 is of a smaller diameter than that of coplanar pulley 65. This provides that rotation of the knob 70 results in fine control of the angular location of the radio mounting platform 19.

As illustrated in FIGURE 3, the driven pulleys 38 and 65 may be of equal diameters. Alternatively, they may have different diameters as illustrated in the lower plan view of the cabinet 11.

A holding mechanism 85 for a portable radio 86 is mounted to the upper surface of the second or uppermost platform 19. The radio holding mechanism 85 comprises generally a pair of upwardly extending spaced-apart and parallelly disposed flanges 87 and 88. These flanges are preferably spaced equidistantly from the axis 20 about which platforms 18 and 19 rotate. Such orientation insures that, when the radio 86 is held between the flanges 87 and 88, the platform 19 is not loaded eccentrically. Flange 87 is simply a rectangular plate. Flange 88, on the other hand, has a pair of apertures 89 drilled through its extent parallel to the surface of the platform 19. These apertures 89 are threaded and engage wing nuts 90 therein. The wing nuts 90 mount a plate 91 at their ends between flanges 87 and 88. Provision of the plate 91 assures that when the wing nuts 90 are tightened relative to flange 88 the radio 86 is not damaged by the localized exertion of force by the wing nuts 90, but rather that the force is distributed over an extended area of the radio such that the radio is not damaged in appearance.

The indicator 22 mounted to the underside of the platform 19 and cooperating with the compass rose 21 preferably is oriented to lie parallel to the planes of the radio mounting flanges 87 and 88. However, depending upon the nature of the meter 95 utilized in this invention, the pointer 22 may be perpendicular to the plane of these flanges. The requirement in either case, however, is that the indicator 22 be mounted radially with respect to the axis 20.

As illustrated in FIGURE 1, a meter 95 is mounted to the chassis 11 between the control knobs 44 and 70. The meter 95 is responsive to an electrical condition in the portable radio 86 mounted to the platform 19. The meter 95 has a calibrated dial 96 and a pointer 97. A pair of electrical leads or conductors 98 and 99 (see FIGURE 2) extend from terminals 100 and 101 on the underside of the meter 95. These conductors 98 and 99 are passed upwardly through the longitudinal or axial bore 58 of the upper platform shaft 56 and are connected to a jack or plug element 105 adjacent the upper end of the cabinet 11.

In the apparatus described above the mechanisms utilized to mount the platforms and pulleys to the shafts may be varied or altered in order to conform to particular manufacturing techniques without departing from the scope of this invention. The functions served by the apparatus should be retained.

FIGURES 4 and 5 schematically illustrate portions of the circuits of two different types of transistor radios. In FIGURE 4, the meter 95 is connected through a bias resistor 106 to the emitter 107 of a transistor 108 in the first intermediate frequency (I.F.) stage of a radio 86'. The other terminal 101 of the meter 95 is grounded. In FIGURE 5, a second type of transistor radio 86" is illustrated with the meter 95 shown connected by a diode 110 to a feedback lead 113 between transistors 111 and 112. Transistor 111 is in the first I.F. stage of the radio. In this case, the diode 110 is required so that only direct current be passed to the meter 95, even though alternating current signals are present in the feedback lead 113.

When a transistor radio is utilized in connection with this invention, the indicator 22 on the radio platform 19 is aligned parallel to the flanges 87 and 88. In this respect the indicator 22 is coplanar with the loop-type or dipole antenna normally installed in a transistor radio. A dipole or loop antenna has directional sensitivity, but any compact directional antenna compatible with portable radios is within the scope of this invention. In a transistorized radio, when the radio is properly tuned to a station having a particular frequency the least amount of current flows through a transistor of the circuit. As the tuning of the circuit departs from the broadcast frequency an increased amount of current flows through the transistors. When the radio 86 utilized with this invention is a transistor radio, the meter 95 is a current meter preferably registering in the range of milliammeters.

To operate the direction finder 10, the radio 86 is secured relative to the platform 19 and the jack or connecting plug 105 is secured into a receptacle which has previously been provided in the radio 86. After the radio 86 has been turned on and tuned to a particular frequency corresponding to that of a known radio station, the platform 19 is rotated. As the platform 19 is rotated the pointer 97 of meter 95 will tend to move along the dial 96. When the meter 95 indicates the greatest flow of current through the circuit of the radio, the radio is positioned such that the planar antenna of the radio is aligned in the direction of the radio station. At this point the relative bearing of the radio station with respect to the environment of the direction finder 10 may be obtained by reading the bearing from the compass rose as indicated by the pointer 22.

If the radio 86 utilized with the direction finder 10 is a tube-type radio, then the meter 95 should be a voltage indicating meter and the connection into the circuit of the radio is made in a manner such that the voltage in the first I.F. stage is fed to the meter. Also, the upper platform indicator pin 22 should be moved ninety degrees (90°) so as to be perpendicular to the planes of the flanges 87 and 88. This is because the maximum voltage is sensed when the dipole or directionally sensitive antenna of the radio is oriented perpendicular to a line to the radio station.

No matter what type of portable radio is used, the power to operate the direction finder 10 is derived from the radio 86. No special power source is required.

In FIGURE 1, the lower or compass rose platform 18 is provided with a coplanar lug or extension 115. This extension, as indicated by FIGURE 1, is centered about that portion of the compass rose index 21 which bears the indicia for North. A conventional magnetic compass 116, having a dial pointer 117 mounted for pivoting about an axis 118, is mounted in the extension 115 with the North and South axis of the compass 116 being aligned with the compass rose index line corresponding to North.

If, say, a small power boat is overtaken by fog out of hearing of any existing fog horns, the direction of land from the craft is often unknown. Utilizing this invention, the first stage of a direction finding operation facilitating navigation is to align the compass rose or lower platform 18 so that the platform is aligned with magnetic North. The platform 18 is rotated by control through knob 44 until the North index line of the compass rose or direction indicating chart 21 is aligned with North. This occurs when the pointer 117 of the compass 116 is aligned with the North index of the rose 21. Then the portable radio 86 is inserted into its holding mechanism 85 and the plug or connection 105 is engaged. The radio 86 is then turned on and dialed to the frequency of a radio station which has a known location. The upper platform 19 is then rotated by control knob 70 until the radio is aligned relative to the radio station in such a manner that the indication of the needle 97 on the dial 96 of meter 95 is at a maximum. Then the bearing of the radio station with respect to magnetic North is determined by observation of the location of the indicator 22 with respect to the compass rose 21. With this information, the operator of the direction finder and navigational aid 10 may then steer a course based upon magnetic North.

From the foregoing explanation of one aspect of the operation of this invention, one of the particular advantages of this invention is apparent. In many of the standard radio direction finders known heretofore, such devices are heavy and require secure mountings. The entire boat must be maneuvered in order to properly obtain a directional reading from the direction finder. Using this invention, the craft can maintain its desired course while the reading is being taken. This is particularly important in the case of small boats involved in heavy seas where maneuvering is often impossible. If maneuvering were attempted it is likely that the craft may be caught in the trough of a wave train and be swamped. With this invention, however, the reading may be taken while the vessel is sailing into the wind.

Charts may be provided with this invention. These charts indicate the locations of radio stations in a particular geographical area. Furthermore, the frequencies upon which these radio stations broadcast are indicated. With the direction finding apparatus 10 provided by this invention in conjunction with these charts it is possible to obtain a "fix" upon the actual location of a vessel utilizing such apparatus. This is done by the conventional navigational technique known as "triangulation."

While the invention has been described above in conjunction with specific apparatus, it is to be understood that this has been by way of description and explanation only and not as a limitation to the scope of this invention.

I claim:

1. Apparatus for utilizing a portable radio as a direction finder comprising a base, a first table mounted to the base for rotation about an axis, a direction indicating device mounted to the first table, a second table mounted for rotation above the first table and about the axis, an indicator mounted to the second table cooperating with the direction indicating device, means for rotating the first and second tables independently of one another, means on the second table for securing a portable radio in fixed relation thereto, meter means on the base responsive to a predetermined circuit characteristic of the radio, and electrical conductor means extending between the meter means and the second table and engagable with a predetermined portion of a circuit of the radio.

2. Apparatus according to claim 1 wherein the portable radio is a transistor radio and wherein the meter means is an ammeter.

3. Apparatus according to claim 1 wherein the portable radio is a tube-type radio and wherein the meter means is a voltmeter.

4. Apparatus for utilizing a portable radio as a direction finder comprising a base, a direction indicating device mounted to the base for movement about an axis, radio holder means mounted to the base for rotation about the axis, the radio holder means including an indicator cooperating with the direction indicating device, means for moving the direction indicating device and the radio holder means about the axis independently of one another, meter means on the base responsive to a predetermined circuit characteristic of a portable radio, and means extending between the meter means and the radio holder means for operatively coupling a predetermined point of a selected circuit of a portable radio engaged with the radio holder means with the meter means.

References Cited in the file of this patent

UNITED STATES PATENTS

| 1,794,964 | Knutson | Mar. 3, 1931 |

FOREIGN PATENTS

| 233,628 | Great Britain | May 14, 1925 |
| 1,264,544 | France | May 15, 1961 |

OTHER REFERENCES

Radio-Electronics, May 1960, pp. 94, 95, 98.
Radio and TV News, June 1957, pp. 42–44.